(12) United States Patent
Shibata et al.

(10) Patent No.: US 10,981,105 B2
(45) Date of Patent: Apr. 20, 2021

(54) CARBON DIOXIDE CAPTURING SYSTEM AND OPERATION METHOD OF CARBON DIOXIDE CAPTURING SYSTEM

(71) Applicants: Kabushiki Kaisha Toshiba, Minato-ku (JP); Toshiba Energy Systems & Solutions Corporation, Kawasaki (JP)

(72) Inventors: Ryosuke Shibata, Yokohama (JP); Hideo Kitamura, Katsushika (JP); Kiyohiko Iwasa, Yokohama (JP); Masatoshi Hodotsuka, Saitama (JP); Mitsuru Udatsu, Kawasaki (JP)

(73) Assignees: Kabushiki Kaisha Toshiba, Minato-ku (JP); Toshiba Energy Systems & Solutions Corporation, Kawasaki (JP)

(*) Notice: Subject to any disclaimer, the term of this patent is extended or adjusted under 35 U.S.C. 154(b) by 200 days.

(21) Appl. No.: 16/039,980

(22) Filed: Jul. 19, 2018

(65) Prior Publication Data
US 2019/0126192 A1    May 2, 2019

(30) Foreign Application Priority Data
Oct. 27, 2017 (JP) ............................. JP2017-208473

(51) Int. Cl.
*B01D 53/14* (2006.01)

(52) U.S. Cl.
CPC ..... *B01D 53/1475* (2013.01); *B01D 53/1425* (2013.01); *B01D 53/1493* (2013.01);
(Continued)

(58) Field of Classification Search
None
See application file for complete search history.

(56) References Cited

U.S. PATENT DOCUMENTS 8,741,028 B2    6/2014  Muraoka et al.
8,806,870 B2    8/2014  Hirata et al.
(Continued)

FOREIGN PATENT DOCUMENTS

CN    104492229    4/2015
CN    107271109    10/2017
(Continued)

OTHER PUBLICATIONS

Office Action dated Feb. 14, 2019 in United Kingdom Patent Application No. GB1813586.3.

*Primary Examiner* — Anita Nassiri-Motlagh
(74) *Attorney, Agent, or Firm* — Oblon, McClelland, Maier & Neustadt, L.L.P.

(57) ABSTRACT

A carbon dioxide capturing system according to an embodiment is provided with a reboiler which heats an absorption liquid in a regeneration tower with a heated steam, and condenses the heated steam to generate a downstream side condensed water. The heated steam is supplied to the reboiler by an upstream side line. The downstream side condensed water is discharged from the reboiler by a downstream side line. A branched line branches from the upstream side line. The heated steam supplied to the branched line is cooled and condensed by an upstream side cooler, and an upstream side condensed water is generated. A physical quantity of an absorption liquid component in the upstream side condensed water and a physical quantity of an absorption liquid component in the downstream side condensed water are measured by a physical quantity measurement device.

12 Claims, 6 Drawing Sheets

(52) U.S. Cl.
 CPC .... *B01D 53/1412* (2013.01); *B01D 2252/103* (2013.01); *B01D 2252/204* (2013.01); *B01D 2252/20484* (2013.01); *B01D 2252/20489* (2013.01); *B01D 2257/504* (2013.01); *B01D 2258/0283* (2013.01)

(56) References Cited

U.S. PATENT DOCUMENTS

| | | |
|---|---|---|
| 9,782,720 B2 | 10/2017 | Yukumoto et al. |
| 2016/0296880 A1 | 10/2016 | Saito et al. |

FOREIGN PATENT DOCUMENTS

| | | |
|---|---|---|
| EP | 1 473 072 A1 | 11/2004 |
| JP | 2004-323339 | 11/2004 |
| JP | 2012-152731 | 8/2012 |
| JP | 2012-202217 | 10/2012 |
| JP | 2013-186091 | 9/2013 |

# CARBON DIOXIDE CAPTURING SYSTEM AND OPERATION METHOD OF CARBON DIOXIDE CAPTURING SYSTEM

CROSS-REFERENCE TO RELATED APPLICATION

This application is based upon and claims the benefit of priority from the prior Japanese Patent Application No. 2017-208473, filed on Oct. 27, 2017, the entire contents of which are incorporated herein by reference.

FIELD

Embodiments described herein relate generally to a carbon dioxide capturing system and an operation method of a carbon dioxide capturing system.

BACKGROUND

Recently, as effective measures to the global warming issues, a carbon dioxide capture and storage (CCS: Carbon Dioxide Capture and Storage) technology to capture and store carbon dioxide (CO2) has been noticed. Specifically, a carbon dioxide capturing system which recovers carbon dioxide in a plant exhaust gas (exhaust gas to be processed) to be discharged from a thermal power plant, a steel plant, a waste disposal factory and so on with an absorption liquid has been considered.

As one of the carbon dioxide capture and storage technologies, a carbon dioxide capturing system using a chemical absorption method is known. The carbon dioxide capturing system like this is provided with an absorption tower and a regeneration tower. In the absorption tower out of these, carbon dioxide contained in a plant exhaust gas is absorbed by an absorption liquid containing an absorption liquid component such as amine and water. By this means, the absorption liquid becomes a rich liquid. At this time, the plant exhaust gas which has discharged carbon dioxide is discharged from the absorption tower. The rich liquid which has absorbed carbon dioxide is supplied to the regeneration tower. The rich liquid supplied to the regeneration tower is heated to discharge carbon dioxide, and becomes a lean liquid. At this time, the discharged carbon dioxide is discharged, along with steam, from the regeneration tower. By this means, carbon dioxide is separated and recovered. The lean liquid is returned to the absorption tower, and absorbs carbon dioxide again in the regeneration tower to become the rich liquid. In this manner, the absorption liquid circulates through the absorption tower and the regeneration tower, and thereby carbon dioxide which has been contained in the plant exhaust gas is configured to be recovered continuously.

The rich liquid is heated in the regeneration tower by a reboiler. Steam (steam extracted or exhausted from a steam turbine, for example, hereinafter written as heated steam) is supplied from upstream facilities, such as a power plant, to the reboiler. In the reboiler, a part of the lean liquid discharged from the regeneration tower is heated with the heated steam to generate a steam (hereinafter, written as an absorption liquid steam). The generated absorption liquid steam is returned to the regeneration tower, and thereby the rich liquid in the regeneration tower is heated.

The heated steam which has heated the lean liquid in the reboiler is condensed to become a condensed water. The condensed water is returned to the upstream facilities, and is heated by a boiler and is supplied to the steam turbine.

While flowing through a space partitioned inside the reboiler, the heated steam and the lean liquid perform heat exchange with each other. For example, when one of the heated steam and the lean liquid flows in a pipe, the other flows outside the pipe, and the heated steam and the lean liquid perform heat exchange with each other during this process. The inventors of the present application have found that when a gap is present in coupling portions of members such as a plurality of pipes, there is a possibility that the absorption liquid steam leaks from the gap, and can be mixed into the heated steam. In addition, the inventors of the present application have found that the heated steam mixed with the absorption liquid steam can disturb an operation of more upstream facilities, such as a boiler and a steam turbine.

In order to deal with this, it is thought to monitor a leak amount of the absorption liquid component, using a measurement instrument to measure the absorption liquid component in the condensed water discharged from the reboiler. However, there is a possibility that a measurement value to be obtained by the measurement instrument can include an error specific to the measurement instrument or an error due to disturbance or the like. In this case, it can become difficult to detect the leak of the absorption liquid component with high accuracy.

DETAILED DESCRIPTION

A carbon dioxide capturing system according to an embodiment is provided with an absorption tower to make an absorption liquid absorb carbon dioxide contained in an exhaust gas to be processed, a regeneration tower to make the carbon dioxide to be discharged from the absorption liquid to be supplied from the absorption tower, and a reboiler which heats the absorption liquid in the regeneration tower with a heated steam, and condenses the heated steam to generate a downstream side condensed water. The heated steam is supplied to the reboiler by an upstream side line. The downstream side condensed water is discharged from the reboiler by a downstream side line. A branched line coupled to the downstream side line branches from the upstream side line. The heated steam supplied to the branched line is cooled and condensed by an upstream side cooler, and an upstream side condensed water is generated. The upstream side condensed water is one example of the supply water. A physical quantity of an absorption liquid component in the upstream side condensed water and a physical quantity of an absorption liquid component in the downstream side condensed water are measured by a physical quantity measurement device. The downstream side condensed water is one example of the condensed water.

In addition, an operation method of a carbon dioxide capturing system according to an embodiment is an operation method of a carbon dioxide capturing system provided with an absorption tower to make an absorption liquid absorb carbon dioxide contained in an exhaust gas to be processed, a regeneration tower to make the carbon dioxide to be discharged from the absorption liquid to be supplied from the absorption tower, and a reboiler which heats the absorption liquid in the regeneration tower with a heated steam, and condenses the heated steam to generate a downstream side condensed water. The regeneration tower is one example of the regenerator. The reboiler is one example of the heat exchanger. The operation method is provided with a process to supply the heated steam to the reboiler, a process to discharge the downstream side condensed water from the reboiler, a process to cool and condense a part of the heated steam to be supplied to the reboiler to generate an upstream side condensed water, a process to measure a physical quantity of an absorption liquid component in the upstream side condensed water, and a process to measure a physical quantity of an absorption liquid component in the downstream side condensed water.

Hereinafter, carbon dioxide capturing systems and operation methods of a carbon dioxide capturing system in embodiments of the present invention will be described with reference to the drawings.

First Embodiment

To begin with, a carbon dioxide capturing system and an operation method of a carbon dioxide capturing system in a first embodiment will be described using FIG. 1 and FIG. 2.

Figure 1:
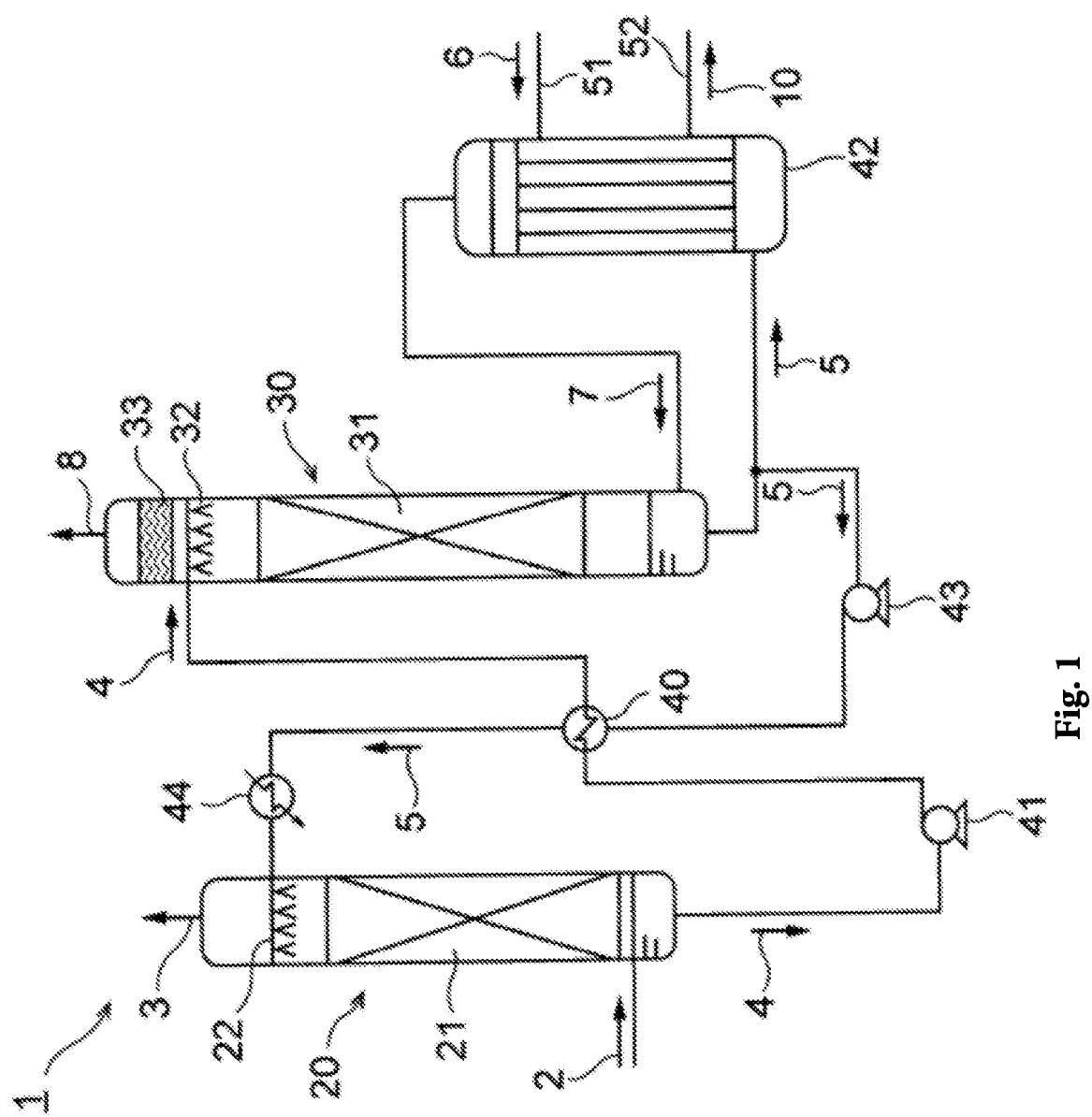
FIG. 1 is a diagram showing a fundamental configuration of a carbon dioxide capturing system in a first embodiment.

As shown in FIG. 1, a carbon dioxide capturing system 1 is provided with an absorption tower 20 having an absorption portion (packed layer) and a regeneration tower 30 having a regeneration portion 31 (packed layer). The absorption portion 21 out of these makes a lean liquid 5 absorb carbon dioxide contained in a plant exhaust gas 2. The regeneration portion 31 makes carbon dioxide to be discharged from a rich liquid 4 to be supplied from the absorption tower 20, and generates the lean liquid 5 from the rich liquid 4. In the present embodiment, the rich liquid 4 indicates the absorption liquid absorbing carbon dioxide, and the lean liquid 5 indicates the absorption liquid discharging carbon dioxide.

The absorption tower 20 has the absorption portion 21 and a liquid dispersion device 22. The absorption portion 21 is configured as a counter flow type gas-liquid contactor. The liquid dispersion device 22 is provided above the absorption portion 21.

The absorption tower 20 introduces the plant exhaust gas 2 (exhaust gas to be processed) containing carbon dioxide from the lower portion of the absorption tower 20 by a blower (not shown). The exhaust gas to be processed called here is an exhaust gas before being discharged outside from the absorption tower 20, and indicates an exhaust gas in a state before carbon dioxide in the exhaust gas is separated. The plant exhaust gas 2 rises inside the absorption tower 20 toward the absorption portion 21. In addition, the absorption tower 20 introduces the lean liquid 5 from the regeneration tower 30 into the liquid dispersion device 22. This lean liquid 5 dispersively drops inside the absorption tower 20 toward the absorption portion 21. In the absorption portion 21, the plant exhaust gas 2 reacts with the lean liquid 5. The lean liquid 5 absorbs carbon dioxide in the plant exhaust gas 2 to become the rich liquid 4. After having been stored at the bottom portion of the absorption tower 20, the rich liquid 4 is discharged from the relevant bottom portion. The plant exhaust gas from which carbon dioxide has been removed is discharged from the top portion of the absorption tower 20 as an absorption tower exhaust gas 3.

A regenerative heat exchanger 40 is provided between the absorption tower 20 and the regeneration tower 30. A rich liquid pump 4 is provided between the absorption tower 20 and the regenerative heat exchanger 40, and leads the rich liquid 4 discharged from the absorption tower 20 sequentially to the regenerative heat exchanger 40 and the regeneration tower 30. In the regenerative heat exchanger 40, the rich liquid 4 to be supplied from the absorption tower 20 to the regeneration tower 30 exchanges heat with the lean liquid 5 to be supplied from the regeneration tower 30 to the absorption tower 20. By this means, the lean liquid 5 acts as a heat source to heat the rich liquid 4 to a prescribed temperature. In other word, the rich liquid 4 acts as a cold source to cool the lean liquid 5 to a prescribed temperature.

The regeneration tower 30 has the regeneration portion 31, a liquid dispersion device 32 and a demister 33. The regeneration portion 31 is configured as a counter flow type gas-liquid contactor. The liquid dispersion device 32 and the demister 33 are provided in this order above the regeneration portion 31.

A reboiler 42 is coupled to the regeneration tower 30, and heats the lean liquid 5 inside the regeneration tower 30 using a heated steam 6 as a heat source. More specifically, a part of the lean liquid 5 to be discharged from the bottom portion of the regeneration tower 30 is supplied to the reboiler 42, and the heated steam 6 is supplied to the reboiler 42 from an upstream side line 51 of a heated steam supply and discharge system 50 described later. The upstream side line 51 is one example of the providing line.

In the reboiler 42, the lean liquid 5 exchanges heat with the heated steam 6. By this means, the heated steam 6 acts as a heat source to heat the lean liquid 5. In other word, the lean liquid 5 acts as a cold source to cool the heated steam 6. The heated steam 6 after cooling is condensed to become a downstream side condensed water 10. The downstream side condensed water 10 is discharged to a first downstream side line 57 of the heated steam supply and discharge system 50 described later. The downstream side line 57 is one example of the discharging line.

The lean liquid 5 after heating becomes an absorption liquid steam 7 and is supplied to the lower portion of the regeneration tower 30. The absorption liquid steam 7 rises inside the regeneration tower 30 toward the regeneration portion 31. In addition, in the regeneration tower 30, the rich liquid 4 from the absorption tower 20 is introduced into the liquid dispersion device 32. The rich liquid 4 dispersively drops inside the regeneration tower 30 toward the regeneration portion 31. In the regeneration portion 31, the rich liquid 4 comes in gas-liquid contact with the absorption liquid steam 7. The rich liquid 4 discharges carbon dioxide and returns to the lean liquid 5 again. That is, in the regeneration tower 30, carbon dioxide is discharged and thereby the rich liquid 4 becomes the lean liquid 5. After having been stored once at the bottom portion of the regeneration tower 30, the lean liquid 5 is discharged from the relevant bottom portion. After having come in gas-liquid contact with the rich liquid 4, the absorption liquid steam 7 becomes a regeneration tower exhaust gas 8 containing carbon oxide and is discharged from the upper portion of the regeneration portion 31. The regeneration tower exhaust gas 8 is discharged from the top portion of the regeneration tower 30 through the demister 33. The demister 33 catches mist and an absorption liquid component contained in the regeneration tower exhaust gas 8.

The lean liquid pump 43 is provided between the regeneration tower 30 and the regenerative heat exchanger 40, and leads the lean liquid 5 discharged from the regeneration tower 30 sequentially to the above-described regenerative heat exchanger 40 and the absorption tower 20. As described above, the regenerative heat exchanger 40 exchanges heat between the lean liquid 5 to be supplied from the regeneration tower 30 to the absorption tower 20 and the rich liquid 3 to be supplied from the absorption tower 20 to the regeneration tower 30. In addition, a lean liquid cooler 44 is provided on a downstream side in the flow direction of the lean liquid 5 from the regenerative heat exchanger 40. The lean liquid cooler 44 supplies a coolant (cooling water) from outside, and further cools the lean liquid 5 which has been cooled in the regenerative heat exchanger 40 to a desired temperature.

After having passed through the lean liquid cooler 44, the lean liquid 5 is supplied to the liquid dispersion device 22 of the absorption tower 20 and dispersively drops, and is supplied to the absorption portion 21. In this manner, in the carbon dioxide capturing system 1, the absorption liquid circulates while repeating the state in which the absorption liquid becomes the lean liquid 5 and the state in which the absorption liquid becomes the rich liquid 4.

In this manner, the absorption liquid circulates between the absorption tower 20 and the regeneration tower 30, and in the absorption tower 20 the absorption liquid absorbs carbon dioxide to become the rich liquid 4, and in the regeneration tower 30, the absorption liquid discharges carbon dioxide to become the lean liquid 5. In addition, a water solution of an amine compound such as monoethanolamine, diethanolamine can be suitably used as the absorption liquid, but the absorption liquid is not limited to a water solution of a kind of amines like these. In addition, the absorption liquid can be composed of a water solution containing one or more kinds of amines.

The carbon dioxide capturing system 1 shown in FIG. 1 is further provided with the heated steam supply and discharge system which supplies the heated steam 6 to the reboiler 42 and discharges the downstream side condensed water 10 which has been generated in the reboiler 42. The heated steam supply and discharge system 50 will be described below using FIG. 2.

Figure 2:
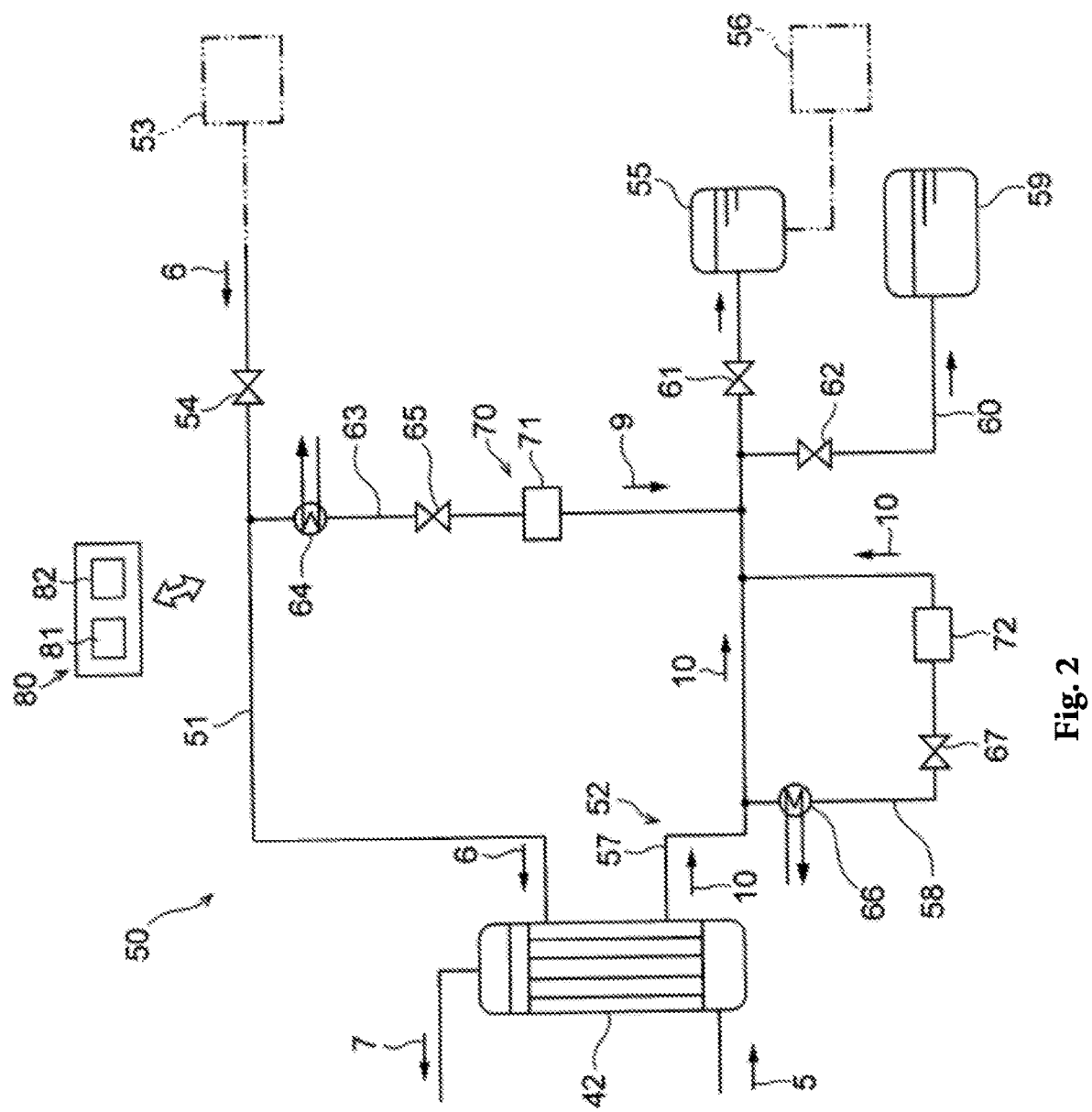
FIG. 2 is a diagram showing a heated steam supply and discharge system in the carbon dioxide capturing system of FIG. 1.

As shown in FIG. 2, the heated steam supply and discharge system 50 has the upstream side line 51 to supply the heated steam 6 to the reboiler 42, and a downstream side line 52 to discharge the downstream side condensed water 10 from the reboiler 42.

The upstream side line 51 is coupled to a heated steam supply source 53 to supply the heated steam 6 to the reboiler 42. The heated steam supply source 53 is composed of a steam turbine that is the upstream facilities of the carbon dioxide capturing system 1, for example. In this case, the heated steam 6 is a high temperature steam extracted or discharged from the steam turbine. In addition, the heated steam 6 is not limited to a high temperature steam from the steam turbine.

An interlock valve 54 is provided in the upstream side line 51. The interlock valve 54 is arranged on an upstream side in the upstream side line 51 from a position from which a branched line described later branches. The interlock valve 54 controls supply of the heated steam 6 to the upstream side line 51.

The downstream side line 52 is coupled to a reboiler drain tank 55. The reboiler drain tank 55 is one example of the drain tank. The downstream side condensed water 10 discharged to the downstream side line 52 and an upstream side condensed water 9 described later are stored in the reboiler drain tank 55. A steam generation source 56 (a boiler, for example) of the upstream facilities is coupled to the reboiler drain tank 55. By this means, the upstream side condensed water 9 and the downstream side condensed water 10 which have been stored in the reboiler drain tank 55 are supplied to the steam generation source 56 and are heated therein. By this means, the upstream side condensed water 9 and the downstream side condensed water 10 become steam and are supplied to the steam turbine in the upstream facilities.

The downstream side line 52 has the first downstream side line 57 and a second downstream side line 58. The first downstream side line 57 out of these couples the reboiler 42 and the reboiler drain tank 55. That is, the upstream end of the first downstream side line 57 is coupled to the reboiler 42, and the downstream end of the first downstream side line 57 is coupled to the reboiler drain tank 55. The second downstream side line 58 branches from the first downstream side line 57 and merges with the first downstream side line 57. That is, the upstream end of the second downstream side line 58 is coupled to the first downstream side line 57, and the downstream end of the second downstream side line 58 is coupled to the first downstream side line 57. By this means, a part of the downstream side condensed water 10 through a downstream side measurement instrument 72 (described later) provided in the second downstream side line 58. In addition, a pump (not shown) for sending the downstream side condensed water 10 to the downstream side can be provided in the first downstream side line 57. In each line for a condensed water described later, a pump can be arbitrarily provided.

A waste liquid tank 59 is coupled to the first downstream side line 57. The waste liquid tank 59 is coupled to the downstream side line 52 via a waste liquid line 60 which is branched from the first downstream side line 57. When it is assumed that the absorption liquid component leaks in the reboiler 42, the waste liquid tank 59 recovers the upstream side condensed water 9 and the down side condensed water 10. The upstream end of the waste liquid line 60 is coupled to the first downstream side line 57, and the downstream end of the waste liquid line 60 is coupled to the waste liquid tank 59. The upstream end out of these is coupled to a position on the downstream side from a position with which the second downstream side line 58 merges in the first downstream side line 57.

A drain valve 61 is provided in the first downstream side line 57. The drain valve 61 is arranged between a position from which the waste liquid line 60 branches and the reboiler drain tank 55 in the first downstream side line 57. The drain valve 61 controls supply of the upstream side condensed water 9 and the downstream side condensed water 10 to the reboiler drain tank 55.

A waste liquid valve 62 is provided in the waste liquid line 60. The waste liquid valve 62 controls supply of the upstream side condensed water 9 and the downstream side condensed water 10 to the waste liquid tank 59.

As shown in FIG. 2, the branched line 63 branches from the upstream side line 51. The branched line 63 is one example of the connection line. The branched line 63 is coupled to the first downstream side line 57. That is, the upstream end of the branched line 63 is coupled to the upstream side line 51, and the downstream side is coupled to the first downstream side line 57. The upstream end out of these is coupled to a portion between the interlock valve 54 and the reboiler 42 in the upstream side line 51. The downstream side is coupled to a portion between a position with which the second downstream side line 58 merges and a position from which the waste liquid line 60 branches in the first downstream side line 57. A part of the heated steam 6 flowing in the upstream side line 51 flows into the branched line 63, and becomes the upstream side condensed water 9 described later without passing through the reboiler 42, and is supplied to the first downstream side line 57.

An upstream side cooler 64 is provided in the branched line 63. The upstream side cooler 64 is one example of the cooler. The upstream side cooler 64 cools the heated steam 6 supplied from the upstream side line 51 to the branched line 63. By this means, the heated steam 6 is condensed, and thereby the upstream side condensed water 9 is generated. The upstream side cooler 64 is arranged on the upstream side from an upstream side measurement instrument 71 described later.

In addition, an upstream side valve 65 is provided in the branched line 63. The upstream side valve is one example of the first cutoff valve. The upstream side valve 65 is arranged between the upstream side cooler 64 and the upstream side measurement instrument 71 described later in the branched line 63. By this means, the upstream side valve 65 controls supply of the upstream side condensed water 9 to the upstream side measurement instrument 71. However, without being limited to this, the upstream side valve 65 can be arranged on the upstream side from the upstream side cooler 64 in the branched line 63.

A downstream side cooler 66 is provided in the second downstream side line 58. The downstream side cooler 66 cools the downstream side condensed water 10 supplied from the first downstream side line 57 to the second downstream side line 58. By this means, when steam is contained in the downstream side condensed water 10, the steam is cooled and condensed. The downstream side cooler 66 is arranged on the upstream side from the downstream side measurement instrument 72 described later In addition, a downstream side valve 67 is provided in the second downstream side line 58. The downstream side valve 67 is one example of the second cutoff valve. The downstream side valve is arranged between the downstream side cooler 66 and the downstream side measurement instrument 72 described later in the second downstream side line 58. By this means, the downstream side valve 67 controls supply of the downstream side condensed water 10 to the downstream side measurement instrument 72. However, without being limited to this, the downstream side valve 67 can be arranged on the upstream side from the downstream side cooler 66 in the second downstream side line 58.

As shown in FIG. 2, the heated steam supply and discharge system 50 has a physical quantity measurement device 70 which measures a physical quantity of an absorption liquid component in the upstream side condensed water 9 and a physical quantity of an absorption liquid component in the downstream side condensed water 10. The physical quantity measurement device 70 is one example of the instrument. In the present embodiment, the physical quantity measurement device 70 includes the upstream side measurement instrument 71 to measure the physical quantity of the absorption liquid component in the upstream side condensed water 9, and the downstream side measurement instrument 72 to measure the physical quantity of the absorption liquid component in the downstream side condensed water 10. The upstream side measurement instrument 71 is called first instrument.

The upstream side measurement instrument 71 is provided in the branched line 63. More specifically, the upstream side measurement instrument 71 is arranged on the downstream side from the upstream side valve 65 in the branched line 63. The downstream side measurement instrument 72 is provided in the second downstream side line 58. The downstream side measurement instrument 72 is called second instrument. More specifically, the downstream side measurement instrument 72 is arranged on the downstream side from the downstream side valve 67 in the second downstream side line 58.

The upstream side measurement instrument 71 can have an optional configuration, if it can measure the physical quantity of the absorption liquid component in the upstream side condensed water 9. As the physical quantity, an electric conductivity, a pH, a spectrum of light, a reflection coefficient to a laser reflected light and fluorescence can be quoted, for example. In addition, as the upstream side measurement instrument 71, an electric conductivity meter to measure an electric conductivity, a pH meter to measure a pH, an infrared spectrophotometer to obtain a spectrum of light by irradiating an object to be measured with an infrared ray, or an oil film sensor to irradiate an object to be measured with a laser light and measure a reflection coefficient or fluorescence can be used, for example. The above description is similarly applied to the downstream side measurement instrument 72.

The interlock valve 54, the drain valve 61, the waste liquid valve 62, the upstream side valve 65 and the downstream side valve 67 which have been described above are controlled by a controller 80. The controller 80 comprises a processor 81 and a transmitter 82. The processor 81 out of these calculates a physical quantity gap that is a gap between the physical quantity of the absorption liquid component in the upstream side condensed water 9 and the physical quantity of the absorption liquid component in the downstream side condensed water 10, and determines whether or not the physical quantity gap has exceeded a threshold value. The transmitter 82 controls the interlock valve 54, the drain valve 61, the waste liquid valve 62, the upstream side valve 65 and the downstream side valve 67. And when it is determined by the processor 81 that the physical quantity gap has exceeded the threshold value, the transmitter 82 commands to close the drain valve 61 and opens the waste liquid valve 62. In addition, the threshold value can be set to an arbitrary value, and setting of the threshold value can be changed in the controller 80.

Next, an operation of the present embodiment with the configuration like this will be described. Here, an operation method of a carbon dioxide capturing system will be described.

While the carbon dioxide capturing system 1 is operated, a part of the lean liquid 5 discharged from the regeneration tower 30 is supplied to the reboiler 42. The heated steam 6 is supplied from the heated steam supply source 53 to the reboiler 42 via the upstream side line 51. By this means, the lean liquid 5 and the heated steam 6 exchange heat with each other, the lean liquid 5 is heated, and thereby the absorption liquid steam 7 is generated. The generated absorption liquid steam 7 is supplied to the regeneration tower 30.

On the other hand, the heated steam 6 is cooled in the reboiler 42 and is condensed. By this means, the downstream side condensed water 10 is generated. The generated downstream side condensed water 10 is discharged from the reboiler 42 through the downstream side line 57 to the reboiler drain tank 55.

At the time of normal operation, the upstream side valve 65, the downstream side valve 67 and the drain valve 61 are opened, and the waste liquid valve 62 is closed.

In this case, a part of the heated steam 6 to be supplied from the heated steam supply source 53 to the reboiler 42 is supplied to the branched line 63. The heated steam 6 supplied to the branched line 63 is cooled and condensed by the upstream side cooler 64. By this means, the upstream side condensed water 9 is generated. The generated upstream side condensed water 9 is supplied to the upstream side measurement instrument 71 through the upstream side valve 65. The physical quantity of the absorption liquid component in the upstream side condensed water 9 is measured in the upstream side measurement instrument 71. The upstream side condensed water 9 which has passed through the upstream side measurement instrument 71 is supplied to the first downstream side line 57, and is supplied to the reboiler drain tank 55 along with the downstream side condensed water 10 passing in the first downstream side line 57.

On the other hand, a part of the downstream side condensed water 10 discharged from the reboiler 42 to the first downstream side line 57 is supplied to the second downstream side line 58. The downstream side condensed water 10 supplied to the second downstream side line 58 is cooled by the downstream side cooler 66. By this means, when steam is contained in the downstream side condensed water 10, the steam is condensed. The cooled downstream side condensed water 10 is supplied to the downstream side measurement instrument 72 through the downstream side valve 67. The physical quantity of the absorption liquid component in the downstream side condensed water 10 is measured in the downstream side measurement instrument 72. The downstream side condensed water 10 which has passed through the downstream side measurement instrument 72 is returned to the first downstream side line 57, and is supplied to the reboiler drain tank 55 along with the upstream side condensed water 9 supplied from the branched line 63.

The physical quantity gap that is the gap between the physical quantity of the absorption liquid component in the upstream side condensed water 9 measured by the upstream side measurement instrument 71 and the physical quantity of the absorption liquid component in the downstream side condensed water 10 measured by the downstream side measurement instrument 72 is obtained in the processor 81 of the controller 80. The processor determines whether or not the physical quantity gap has exceeded the threshold value.

Here, when the processor 81 determines that the physical quantity gap has exceeded the threshold value, it is deemed that the absorption liquid component leaks in the reboiler 42, and the transmitter 82 commands to close the drain valve 61 and opens the waste liquid valve 62. In this case, the upstream side condensed water 9 and the downstream side condensed water 10 passing in the first downstream side line 57 are recovered in the waste liquid tank 59 via the waste liquid line 60. In addition, when the physical quantity gap has exceeded the threshold value, not only the drain valve 61 but also the interlock valve 54 can be closed while opening the waste liquid valve 62.

Meanwhile, an opening of the upstream side valve 65 can be adjusted to control a flow rate of the upstream side condensed water 9 to be supplied to the upstream side measurement instrument 71. For example, the upstream side valve 65 can be adjusted so as to make a flow rate of the upstream side condensed water 9 to be supplied to the upstream side measurement instrument 71 low. By this means, it is possible to reduce a time gap between a time until a part of the heated steam 6 supplied to the upstream side line 51 becomes the downstream side condensed water 9 and reaches the upstream side measurement instrument 71, and a time until another part of the relevant heated steam 6 becomes the downstream side condensed water 10 and reaches the downstream side measurement instrument 72, and suitably these times can be made equal to each other. By this means, it is possible to obtain the physical quantity gap based on the condensed waters derived from the heated steam 6 which has been supplied to the upstream side line 51 at the same time. In this case, it is possible to suppress that an effect of an error due to disturbance or the like is included in the determination as to whether or not the absorption liquid component leaks in the reboiler 42.

In addition, the controller 80 has a storage unit not shown, and the storage unit can store the physical quantity of the absorption liquid component in the upstream side condensed water 9 which has been measured by the upstream side measurement instrument 71, as data associated with a measurement time. In addition, the storage unit can store the physical quantity of the absorption liquid component in the downstream side condensed water which has been measured by the downstream side measurement instrument 72, as data associated with a measurement time. In this case, at the time of obtaining the physical quantity gap, the processor 81 uses the data of the upstream side condensed water 9 at a measurement time that is a prescribed time before the measurement time of the data of the downstream side condensed water 10, as the data of the upstream side condensed water 9. The prescribed time can be made the time gap between the time until a part of the heated steam 6 supplied to the upstream side line 51 becomes the downstream side condensed water 9 and reaches the upstream side measurement instrument 71, and the time until another part of the relevant heated steam 6 becomes the downstream side condensed water 10 and reaches the downstream side measurement instrument 72. The time gap like this can be obtained previously by experiment, analysis or the like. By this means, it is possible to obtain the physical quantity gap based on the condensed waters derived from the heated steam 6 which has been supplied to the upstream side line 51 at the same time. In this case, it is possible to suppress that an effect of an error due to disturbance or the like is included in the determination as to whether or not the absorption liquid component leaks in the reboiler 42.

In addition, a distance between a position branched from the upstream side line 51 and the upstream side measurement instrument 71, and a distance from the position to the downstream side measurement instrument 72 via the reboiler 4 can be made equal. By this means, it is possible to obtain the physical quantity gap based on the condensed waters derived from the heated steam 6 which has been supplied to the upstream side line 51 at the same time. In this case, it is possible to suppress that an effect of an error due to disturbance or the like is included in the determination as to whether or not the absorption liquid component leaks in the reboiler 42.

According to the present embodiment like this, it is possible to measure the physical quantity of the absorption liquid component in the upstream side condensed water 9 which has been generated by condensing the heated steam 6 passing in the upstream side line 51, and the physical quantity of the absorption liquid component in the downstream side condensed water 10 which has been discharged from the reboiler 42. By this means, the physical quantity gap that is the gap between the physical quantity of the absorption liquid component in the upstream side condensed water 9 and the physical quantity of the absorption liquid component in the downstream side condensed water 10 is obtained, and when the physical quantity gap is large, it can be assumed that the absorption liquid component is contained in the downstream side condensed water 10. This determination is based on the gap between a measurement value from the upstream side condensed water 9 which has not passed through the reboiler 42 and a measurement value from the downstream side condensed water 10 which has passed through the reboiler 42. By this means, while an effect of an error specific to the measurement instrument, or an error due to disturbance or the like is being suppressed, it is possible to detect leak of the absorption liquid component in the reboiler 42 with high accuracy.

In addition, according to the present embodiment, the physical quantity of the absorption liquid component in the upstream side condensed water 9 is measured by the upstream side measurement instrument 71, and the physical quantity of the absorption liquid component in the downstream side condensed water 10 is measured by the downstream side measurement instrument 72. By this means, it is possible to continuously measure the physical quantity of the absorption liquid component in the upstream side condensed water 9 and the physical quantity of the absorption liquid component in the downstream side condensed water 10. For the reason, when the absorption liquid component leaks in the reboiler 42, it is possible to promptly detect the leak.

In addition, according to the present embodiment, when the physical quantity gap that is the gap between the physical quantity of the absorption liquid component in the upstream side condensed water 9 and the physical quantity of the absorption liquid component in the downstream side condensed water 10 is large, the drain valve 61 can be closed, and the waste liquid valve 62 can be opened. By this means, the upstream side condensed water 9 and the downstream side condensed water 10 in the first downstream side line 57 can be supplied to the waste liquid tank 59, and can be prevented from being supplied to the reboiler drain tank 55. For the reason, it is possible to prevent that the condensed water mixed with the absorption liquid component is supplied to the steam generation source 56, the heated steam supply source 53 and so on of the upstream facilities.

In addition, according to the present embodiment, when the physical quantity gap that is the gap between the physical quantity of the absorption liquid component in the upstream side condensed water 9 and the physical quantity of the absorption liquid component in the downstream side condensed water 10 has exceeded the threshold value, the drain valve 61 can be closed and the waste liquid valve 62 can be automatically opened by the controller 80. By this means, when it is determined that the absorption liquid component leaks in the reboiler 42, the supply destination of the upstream side condensed water 9 and the downstream side condensed water 10 can be promptly switched to the waste liquid tank 59. For the reason, it is possible to further prevent that the condensed water mixed with the absorption liquid component is supplied to the steam generation source 56, the heated steam supply source 53 and so on of the upstream facilities.

Further, according to the present embodiment, the downstream side condensed water 10 discharged from the reboiler 42 is cooled by the downstream side cooler 66. By this means, even when steam is contained in the downstream side condensed water 10, the steam can be condensed. For the reason, it is possible to prevent that steam is contained in the downstream side condensed water 10 to be supplied to the downstream side measurement instrument 72, and thereby it is possible to improve measurement accuracy by the downstream side measurement instrument 72.

Second Embodiment

Next, a carbon dioxide capturing system and an operation method of a carbon dioxide capturing system in a second embodiment of the present invention will be described using FIG. 3.

Figure 3:
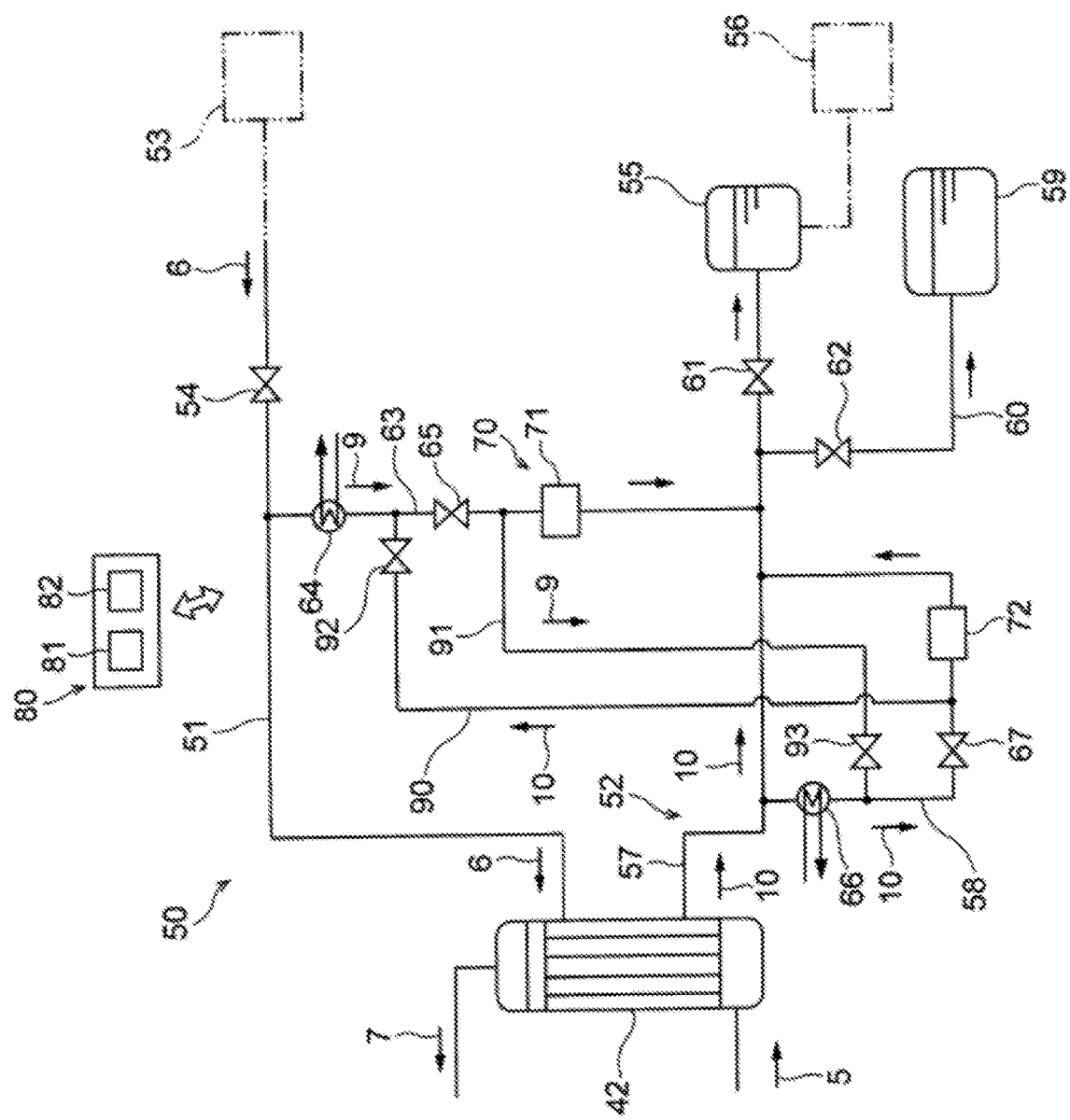
FIG. 3 is a diagram showing a heated steam supply and discharge system in a carbon dioxide capturing system in a second embodiment.

In the second embodiment shown in FIG. 3, a point that a first bypass line to supply the upstream side condensed water to the downstream side measurement instrument, and a second bypass line to supply the downstream side condensed water to the upstream side measurement instrument is mainly different from the first embodiment, and the other configuration is approximately the same as the first embodiment shown in FIG. 1 and FIG. 2. In addition, in FIG. 3, the same symbols are given to the same portions as the first embodiment shown in FIG. 1 and FIG. 2, and the detailed description thereof will be omitted.

As shown in FIG. 3, the carbon dioxide capturing system 1 according to the present embodiment is further provided with a first bypass line 90 to supply the upstream side condensed water 9 to the downstream side measurement instrument 72, and a second bypass line 91 to supply the downstream side condensed water 10 to the upstream side measurement instrument 71. The first bypass line 90 out of these branches from the branched line 63 and merges with the second downstream side line 58. That is, the upstream end of the first bypass line 90 is coupled to a portion between the upstream side cooler 64 and the upstream side valve 65 in the branched line 63. The downstream end of the first bypass line 90 is coupled to a portion between the downstream side valve 67 and the downstream side measurement instrument 72 in the second downstream side line 58. The second bypass line 91 branches from the second downstream side line 58 and merges with the branched line 63. That is, the upstream end of the second bypass line 91 is coupled to a portion between the downstream side cooler 66 and the downstream side valve 67 in the second downstream side line 58. The downstream end of the second bypass line 91 is coupled to a portion between the upstream side valve 65 and the upstream side measurement instrument 71 in the branched line 63.

A first bypass valve 92 is provided in the first bypass line 90. The first bypass valve 92 controls supply of the upstream side condensed water 9 from the first bypass line 90 to the downstream side measurement instrument 72. A second bypass valve 93 is provided in the second bypass line 91. The second bypass valve 93 controls supply of the downstream side condensed water 10 from the second bypass line 91 to the upstream side measurement instrument 71. The first bypass valve 92 and the second bypass valve 93 are controlled by the transmitter 82 of the controller 80.

When the upstream side valve 65 and the downstream side valve 67 are opened, and the first bypass valve 92 and the second bypass valve 93 are closed, the processor 81 of the controller 80 calculates a first physical quantity gap that is the gap between the physical quantity of the absorption liquid component in the upstream side condensed water 9 measured by the upstream side measurement instrument 71 and the physical quantity of the absorption liquid component in the downstream side condensed water 10 measured by the downstream side measurement instrument 72. And the processor 81 determines whether or not the first physical quantity gap has exceeded a threshold value, in the same manner as the first embodiment. When it is determined that the first physical quantity gap has exceeded the threshold value, the transmitter 82 commands to close the upstream side valve 65 and the downstream side valve 67, and to open the first bypass valve 92 and the second bypass valve 93.

On the other hand, when the upstream side valve 65 and the downstream side valve 67 are closed, and the first bypass valve 92 and the second bypass valve 93 are opened, the processor 81 of the controller 80 calculates a second physical quantity gap that is a gap between a physical quantity of the absorption liquid component in the upstream side condensed water 9 measured by the downstream side measurement instrument 72 and a physical quantity of the absorption liquid component in the downstream side condensed water 10 measured by the upstream side measurement instrument 71. And the processor 81 calculates a measurement value gap that is a gap between the above-described first physical quantity gap and the second physical quantity gap, and determines whether or not the measurement value gap has exceeded a measurement threshold value. When it is determined that the measurement value gap has exceeded the measurement threshold value, the transmitter 82 commands to close the upstream side valve 65, the downstream side valve 67, the first bypass valve 92 and the second bypass valve 93. In addition, the measurement threshold value can be set to an arbitrary value, and setting of the measurement threshold value can be changed in the controller 80.

Next, an operation method of the carbon dioxide capturing system 1 according to the present embodiment will be described.

At the time of normal operation, the upstream side valve 65, the downstream side valve 67 and the drain valve 61 are opened, and the waste liquid valve 62, the first bypass valve 92 and the second bypass valve 93 are closed.

In this case, the physical quantity of the absorption liquid component in the upstream side condensed water 9 generated in the upstream side cooler 64 is measured by the upstream side measurement instrument 71, in the same manner as the first embodiment. On the other hand, the physical quantity of the absorption liquid component in the downstream side condensed water cooled in the downstream side cooler 66 is measured by the downstream side measurement instrument 72.

During this time, the first physical quantity gap that is the gap between the physical quantity of the absorption liquid component in the upstream side condensed water 9 measured by the upstream side measurement instrument 71 and the physical quantity of the absorption liquid component in the downstream side condensed water 10 measured by the downstream side measurement instrument 72 is obtained in the processor 81 of the controller 80. The processor 81 determines whether or not the first physical quantity gap has exceeded the threshold value.

Here, when the processor 81 determines that the first physical quantity gap has exceeded the threshold value, the transmitter 82 commands to close the upstream side valve 65 and the downstream side valve 67, and to open the first bypass valve 92 and the second bypass valve 93.

In this case, the upstream side condensed water 9 generated in the upstream side cooler 64 is supplied to the downstream side measurement instrument 72 through the first bypass line 90. The physical quantity of the absorption liquid component in the upstream side condensed water 9 is measured in the downstream side measurement instrument 72. The upstream side condensed water 9 which has passed through the downstream side measurement instrument 72 is returned to the first downstream side line 57, and is supplied, along with the downstream side condensed water 10 which has been supplied from the branched line 63, to the reboiler drain tank 55. In this case, the physical quantity of the absorption liquid component in the upstream side condensed water 9 is measured by the downstream side measurement instrument 72.

On the other hand, the downstream side condensed water 10 cooled in the downstream side cooler 66 is supplied to the upstream side measurement instrument 71 through the second bypass line 91. The physical quantity of the absorption liquid component in the downstream side condensed water 10 is measured in the upstream side measurement instrument 71. The downstream side condensed water 10 which has passed through the upstream side measurement instrument 71 is supplied to the first downstream side line 57, and is supplied, along with the upstream side condensed water 9 passing in the first downstream side line 57, to the reboiler drain tank 55. In this case, the physical quantity of the absorption liquid component in the downstream side condensed water 10 is measured by the upstream side measurement instrument 71.

During this time, the second physical quantity gap that is the gap between the physical quantity of the absorption liquid component in the upstream side condensed water 9 measured by the downstream side measurement instrument 72 and the physical quantity of the absorption liquid component in the downstream side condensed water 10 measured by the upstream side measurement instrument 71 is obtained in the processor 81 of the controller 80. The processor 81 calculates the measurement value gap that is the gap between the first physical quantity gap and the second physical quantity gap, and determines whether or not the measurement value gap has exceeded the measurement threshold value.

Here, when the processor 81 determines that the measurement value gap has not exceeded the measurement threshold value, it is deemed that the upstream side measurement instrument 71 and the downstream side measurement instrument 72 are normal. By this means, it is deemed that the absorption liquid component leaks in the reboiler 42, and the transmitter 82 commands to close the drain valve 61 and to open the waste liquid valve 62, in the same manner as the first embodiment. In this case, the upstream side condensed water 9 and the downstream side condensed water 10 which are passing in the first downstream side line 57 are recovered in the waste liquid tank 59 via the waste liquid line 60.

On the other hand, when the processor 81 determines that the measurement value gap has exceeded the measurement threshold value, the transmitter 82 commands to close the upstream side valve 65, the downstream side valve 67, the first bypass valve 92, and the second bypass valve 93. In this case, the transmitter 82 commands to close a valve (not shown) provided on the downstream side from the upstream side measurement instrument 71 in the branched line 63, and to close a valve (not shown) provided on the downstream side from the downstream side measurement instrument 72 in the second downstream side line 58. By this means, supply of the upstream side condensed water 9 and the downstream side condensed water 10 to the upstream side measurement instrument 71 is stopped, and supply of the upstream side condensed water 9 and the downstream side condensed water 10 to the downstream side measurement instrument 72 is stopped. By this means, the upstream side measurement instrument 71 and the downstream side measurement instrument 72 can be inspected, and can be calibrated, if necessary.

After the inspection, the transmitter 82 commands to open the upstream side valve 65 and the downstream side valve 67, and closes the first bypass valve 92 and the second bypass valve 93. And the transmitter 82 commands to open the above-described valves not shown, and thereby the upstream side condensed water 9 is supplied to the upstream side measurement instrument 71, and the downstream side condensed water 10 is supplied to the upstream side measurement instrument 72. The processor 81 of the controller 80 determines whether or not the first physical quantity gap that is the gap between the physical quantity of the absorption liquid component in the upstream side condensed water 9 measured by the upstream side measurement instrument 71 and the physical quantity of the absorption liquid component in the downstream side condensed water 10 measured by the downstream side measurement instrument 72 has exceeded the threshold value.

When the processor 81 determines that the first physical quantity gap has exceeded the threshold value, it is deemed that the absorption liquid component leaks in the reboiler 42, in the same manner as the first embodiment, and the transmitter 82 commands to close the drain valve 61 and to open the waste liquid valve 62, and thereby the upstream side condensed water 9 and the downstream side condensed water 10 are recovered in the waste liquid tank 59 via the waste liquid line 60.

According to the present embodiment in this manner, the physical quantity of the absorption liquid component in the upstream side condensed water 9 can be measured by the upstream side measurement instrument 71 and the downstream side measurement instrument 72, and the physical quantity of the absorption liquid component in the downstream side condensed water 10 can be measured by the upstream side measurement instrument 71 and the downstream side measurement instrument 72. By this means, it is possible to easily detect whether or not an error specific to the measurement instrument or an error due to disturbance or the like is included in at least one of the measurement value of the upstream side measurement instrument 71 and the measurement value of the downstream side measurement instrument 72. When the error like this is included, the upstream side measurement instrument 71 and the downstream side measurement instrument 72 are calibrated, and thereby it is possible to improve detection accuracy of the leak of the absorption liquid component.

In addition, according to the present embodiment, when the first physical quantity gap that is the gap between the physical quantity of the absorption liquid component in the upstream side condensed water 9 measured by the upstream side measurement instrument 71 and the physical quantity of the absorption liquid component in the downstream side condensed water 10 measured by the downstream side measurement instrument 72 has exceeded the threshold value, the upstream side valve 65 and the downstream side valve 67 can automatically be closed, and the first bypass valve 92 and the second bypass valve 93 can automatically be opened. By this means, it is possible to promptly switch the supply destination of the upstream side condensed water 9 from the upstream side measurement instrument 71 to the downstream side measurement instrument 72, and in addition, it is possible to promptly switch the supply destination of the downstream side condensed water 10 from the downstream side measurement instrument 72 to the upstream side measurement instrument 71. For the reason, it is possible to promptly detect whether or not an error specific to the measurement instrument or an error due to disturbance or the like is included in at least one of the measurement value of the upstream side measurement instrument 71 and the measurement value of the downstream side measurement instrument 72.

In addition, according to the present embodiment, the second physical quantity gap that is the gap between the physical quantity of the absorption liquid component in the upstream side condensed water 9 measured by the downstream side measurement instrument 72 and the physical quantity of the absorption liquid component in the downstream side condensed water 10 measured by the upstream side measurement instrument 71 is obtained, and it is possible to determine whether or not the measurement value gap that is the gap between the first physical quantity gap and the second physical quantity gap has exceeded the measurement threshold value. When the measurement value gap has exceeded the measurement threshold value, it can be deemed that an error specific to the measurement instrument or an error due to disturbance or the like is included in at least one of the measurement value of the upstream side measurement instrument 71 and the measurement value of the downstream side measurement instrument 72. For the reason, it is possible to easily detect accuracy deterioration of the upstream side measurement instrument 71 and the downstream side measurement instrument 72.

In addition, in the above-described present embodiment, the example has been described in which when the first physical quantity gap that is the gap between the physical quantity of the absorption liquid component in the upstream side condensed water 9 and the physical quantity of the absorption liquid component in the downstream side condensed water 10 has exceeded the threshold value, the downstream side condensed water 10 is supplied to the upstream side measurement instrument 71, and the upstream side condensed water 9 is supplied to the downstream side measurement instrument 72. However, without being limited to this, supply of the downstream side condensed water 10 to the upstream side measurement instrument 71 and supply of the upstream side condensed water 9 to the downstream side measurement instrument 72 can periodically be performed. In this case, it is possible to detect beforehand accuracy deterioration of the upstream side measurement instrument 71 and the downstream side measurement instrument 72.

Third Embodiment

Next, a carbon dioxide capturing system and an operation method of a carbon dioxide capturing system in a third embodiment of the present invention will be described using FIG. 4.

Figure 4:
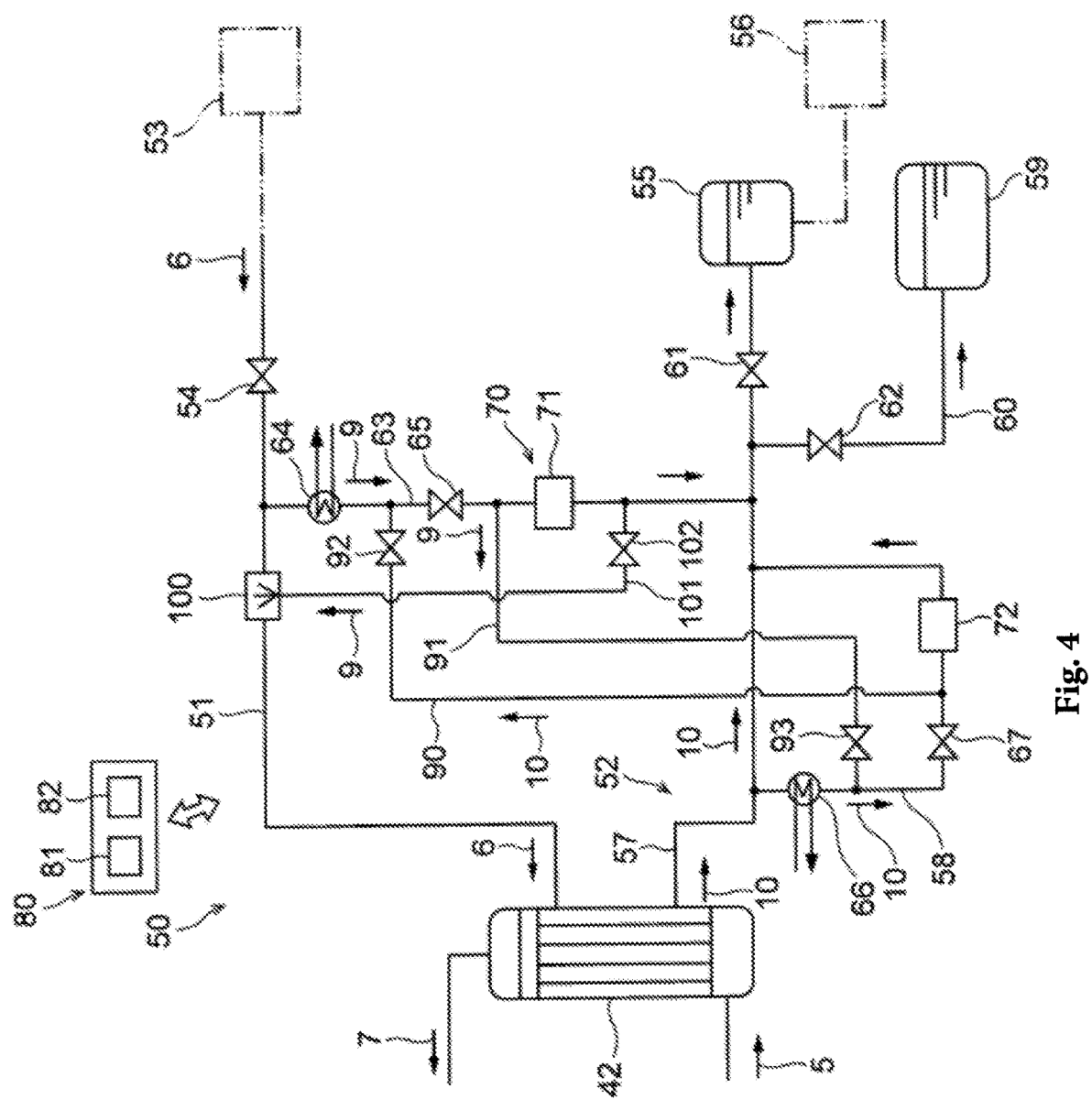
FIG. 4 is a diagram showing a heated steam supply and discharge system in a carbon dioxide capturing system in a third embodiment.

In the third embodiment shown in FIG. 4, a point that a steam cooler is provided on the downstream side from a position from which the branched line branches in the upstream side line is mainly different from the second embodiment, and the other configuration is approximately the same as the second embodiment shown in FIG. 3. In FIG. 4, the same symbols are given to the same portions as the second embodiment shown in FIG. 3, and the detailed description thereof will be omitted.

As shown in FIG. 4, the carbon dioxide capturing system 1 according to the present embodiment is further provided with a steam cooler 100 provided in the upstream side line 51. The steam cooler 100 is arranged on the downstream side from a position from which the branched line 63 branches in the upstream side line 51. In addition, the steam cooler 100 is coupled to the branched line 63 via a steam cooling line 101. The upstream end of the steam cooling line 101 is coupled to a portion on the downstream side from the upstream side measurement instrument 71 in the branched line 63. The downstream end of the steam cooling line 101 is coupled to a portion on the downstream side from the position from which the branched line 63 branches in the upstream side line 51.

A part of the upstream side condensed water 9 which has passed through the upstream side measurement instrument 71 is supplied to the steam cooler 100 via the steam cooling line 101. In the steam cooler 100, the heated steam 6 is cooled by the supplied upstream side condensed water 9. By this means, it is possible to cool the heated steam 6 in a supersaturated state until it becomes in a saturated state. In this case, it is possible to effectively use the latent heat of the heated steam 6 in order to heat the lean liquid 5 in the reboiler 42. For example, the steam cooler 100 can be configured to cool the heated steam 6 by spraying the upstream side condensed water 9.

A steam cooling valve 102 is provided in the steam cooling line 101. The steam cooling valve 102 is controlled by the transmitter 82 of the controller 80.

According to the present embodiment in this manner, the steam cooler 100 provided in the upstream side line 51 cools the heated steam 6 with the upstream side condensed water 9. By this means, it is possible to cool the heated steam 6 by effectively using the upstream side condensed water 9 which has been condensed for measuring the absorption liquid component. For the reason, it is possible to eliminate a cooling medium (cooling water and so on) to be supplied from outside for cooling the heated steam 6.

In addition, in the present embodiment described above, the example wherein the steam cooler 100 is provided in the heated steam supply and discharge system 50 in which the first bypass line 90 and the second bypass line 91 are provided has been described. However, without being limited to this, the steam cooler 100 can be provided in the heated steam supply and discharge system 50 (that is, the heated steam supply and discharge system 50 shown in FIG. 2) in which the first bypass line 90 and the second bypass line 91 are not provided.

Fourth Embodiment

Next, a carbon dioxide capturing system and an operation method of a carbon dioxide capturing system in a fourth embodiment of the present invention will be described using FIG. 5.

Figure 5:
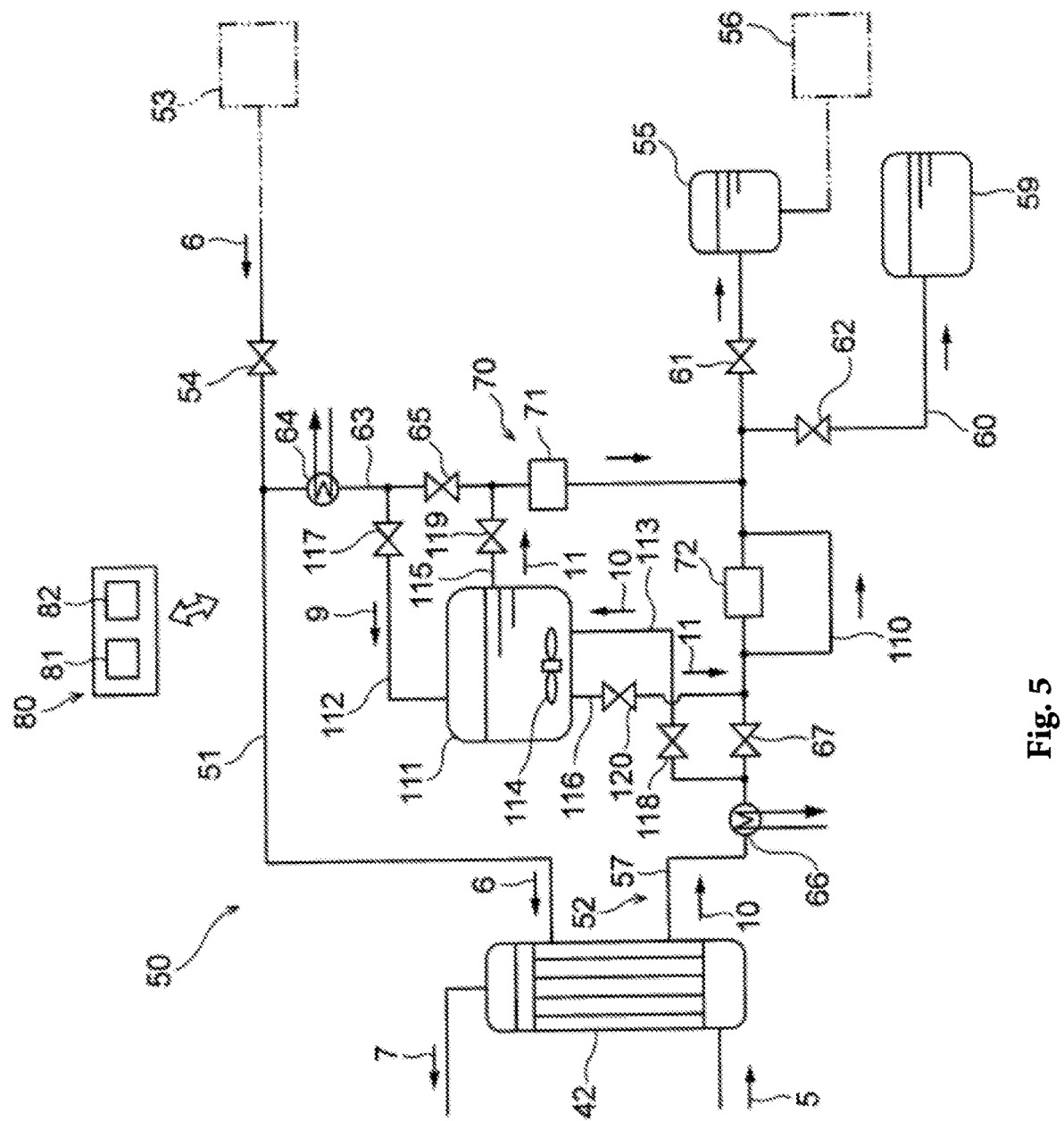
FIG. 5 is a diagram showing a heated steam supply and discharge system in a carbon dioxide capturing system in a fourth embodiment.

In the fourth embodiment shown in FIG. 5, a point that mixed condensed water is supplied from a mixing tank for mixing the upstream side condensed water with the downstream side condensed water to the upstream side measurement instrument and the downstream side measurement instrument is mainly different from the first embodiment, and the other configuration is approximately the same as the first embodiment shown in FIG. 1 and FIG. 2. In addition, in FIG. 5, the same symbols are given to the same portions as the first embodiment shown in FIG. 1 and FIG. 2, and the detailed description thereof will be omitted.

As shown in FIG. 5, in the present embodiment, the downstream side line 52 does not have the second downstream side line 58, and is composed of the first downstream side line 57. The downstream side cooler 66, the down- stream side valve 67 and the downstream side measurement instrument 72 are provided in the first downstream side line 57, and are arranged in the same order as the first embodiment shown in FIG. 2.

In addition, in the present embodiment, a downstream side bypass line 110 is provided in the first downstream side line 57. The downstream side bypass line 110 branches from the first downstream side line 57, bypasses the downstream side measurement instrument 72, and merges with the first downstream side line 57. That is, the upstream end of the downstream side bypass line 110 is coupled to a portion between the downstream side valve 67 and the downstream side measurement instrument 72 in the first downstream side line 57. The downstream end of the downstream side bypass line 110 is coupled to a portion between the downstream side measurement instrument 72 and a position with which the branched line 63 merges in the first downstream side line 57.

As shown in FIG. 5, the carbon dioxide capturing system 1 according to the present embodiment is further provided with a mixing tank 111 which mixes the upstream side condensed water 9 with the downstream side condensed water 10 to generate a mixed condensed water 11.

The mixing tank 111 is coupled to the branched line 63 via a first supply line 112, and thereby the upstream side condensed water 9 is configured to be supplied to the mixing tank 111. More specifically, the upstream end of the first supply line 112 is coupled to a portion between the upstream side cooler 64 and the upstream side valve 65 in the branched line 63, and the downstream end of the first supply line 112 is coupled to the mixing tank 111.

In addition, the mixing tank 111 is coupled to the first downstream side line 57 via a second supply line 113, and thereby the downstream side condensed water 10 is configured to be supplied to the mixing tank 111. More specifically, the upstream end of the second supply line 113 is coupled to a portion between the downstream side cooler 66 and the downstream side valve 67 in the first downstream side line 57, and the downstream end of the second supply line 113 is coupled to the mixing tank 111.

With the configuration like this, the upstream side condensed water 9 and the downstream side condensed water 10 are supplied to and stored in the mixing tank 111. The mixing tank 111 includes a stirring portion 114 to stir the upstream side condensed water 9 with the downstream side condensed water 10, and the upstream side condensed water 9 and the downstream side condensed water 10 are mixed in the mixing tank 111 by the stirring portion 114 to become the mixed condensed water 11.

On the other hand, the mixing tank 111 is coupled to the branched line 63 via a first mixed liquid line 115, and thereby the mixed condensed water 11 is configured to be supplied to the upstream side measurement instrument 71 provided in the branched line 63. The first mixed liquid line 115 is one example of the first mixed water line. More specifically, the upstream end of the first mixed liquid line 115 is coupled to the mixing tank 111, and the downstream end of the first mixed liquid line 115 is coupled to a portion between the upstream side valve 65 and the upstream side measurement instrument 71 in the branched line 63.

In addition, the mixing tank 111 is coupled to the first downstream side line 57 via a second mixed liquid line 116, and thereby the mixed condensed water 11 is configured to be supplied to the downstream side measurement instrument 72 provided in the first downstream side line 57. The second mixed liquid line 116 is one example of the second mixed water line. More specifically, the upstream end of the second mixed liquid line 116 is coupled to the mixing tank 111, and the downstream end of the second mixed liquid line 116 is coupled to a portion between the downstream side valve 67 and a position from which the downstream side bypass line 110 branches in the first downstream side line 57.

A first supply valve 117 is provided in the first supply line 112. The first supply valve 117 controls supply of the upstream side condensed water 9 to the mixing tank 111. A second supply valve 118 is provided in the second supply line 113. The second supply valve 118 controls supply of the downstream side condensed water 10 to the mixing tank 111.

A first mixed liquid valve 119 is provided in the first mixed liquid line 115. The first mixed liquid valve 119 controls supply of the mixed condensed water 11 to the upstream side measurement instrument 71. A second mixed liquid valve 120 is provided in the second mixed liquid line 116. The second mixed liquid valve 120 controls supply of the mixed condensed water 11 to the downstream side measurement instrument 72.

When the upstream side valve 65 and the downstream side valve 67 are opened, and the first supply valve 117, the second supply valve 118, the first mixed liquid valve 119 and the second mixed liquid valve 120 are closed, the processor 81 of the controller 80 calculates the physical quantity gap that is the gap between the physical quantity of the absorption liquid component in the upstream side condensed water 9 measured by the upstream side measurement instrument 71 and the physical quantity of the absorption liquid component in the downstream side condensed water 10 measured by the downstream side measurement instrument 72, in the same manner as the first embodiment. And the processor 81 determines whether or not the physical quantity gap has exceeded the threshold value.

On the other hand, while the upstream side valve 65 and the downstream side valve 67 are closed, and the first supply valve 117, the second supply valve 118, the first mixed liquid valve 119 and the second mixed liquid valve 120 are closed, the processor 81 of the controller 80 calculates a mixing gap that is a gap between a physical quantity of the absorption liquid component in the mixed condensed water 11 measured by the upstream side measurement instrument 71 and a physical quantity of the absorption liquid component in the mixed condensed water 11 measured by the downstream side measurement instrument 72. And the processor 81 determines whether or not the mixing gap has exceeded a mixing threshold value, and when the processor 81 determines that the mixing gap has exceeded the mixing threshold value, the upstream side valve 65, the downstream side valve 67, the first supply valve 117, the second supply valve 118, the first mixed liquid valve 119 and the second mixed liquid valve 120 are closed. In addition, the mixing threshold value can be set to an arbitrary value, and setting of the mixing threshold value can be changed in the controller 80.

Next, an operation method of the carbon dioxide capturing system 1 according to the present embodiment will be described.

At the time of normal operation, the upstream side valve 65, the downstream side valve 67 and the drain valve 61 are opened, and the waste liquid valve 62, the first supply valve 117, the second supply valve 118, the first mixed liquid valve 119 and the second mixed liquid valve 120 are closed.

In this case, the physical quantity of the absorption liquid component in the upstream side condensed water 9 generated in the upstream side cooler 64 is measured by the upstream side measurement instrument 71, in the same manner as the first embodiment. On the other hand, the physical quantity of the absorption liquid component in the downstream side condensed water cooled in the downstream side cooler 66 is measured by the downstream side measurement instrument 72.

During this time, the physical quantity gap that is the gap between the physical quantity of the absorption liquid component in the upstream side condensed water 9 measured by the upstream side measurement instrument 71 and the physical quantity of the absorption liquid component in the downstream side condensed water 10 measured by the downstream side measurement instrument 72 is obtained in the processor 81 of the controller 80. The processor determines whether or not the physical quantity gap has exceeded the threshold value.

Periodically, the upstream side valve 65 and the downstream side valve 67 are closed, and the first supply valve 117, the second supply valve 118, the first mixed liquid valve 119 and the second mixed liquid valve 120 are opened.

In this case, the upstream side condensed water 9 generated in the upstream side cooler 64 is supplied to the mixing tank 111 through the first supply line 112. In addition, the downstream side condensed water 10 cooled in the downstream side cooler 66 is supplied to the mixing tank 111 through the second supply line 113. The upstream side condensed water 9 and the downstream side condensed water 10 which have been supplied to the mixing tank 111 are stirred and mixed by the stirring portion 114. The mixed condensed water 11 is generated in this manner.

The mixed condensed water 11 in the mixing tank 111 is supplied to the upstream side measurement instrument 71 through the first mixed liquid line 115. The physical quantity of the absorption liquid component in the mixed condensed water 11 is measured in the upstream side measurement instrument 71. The mixed condensed water 11 which has passed through the upstream side measurement instrument 71 is supplied to the first downstream side line 57, and is supplied, along with the mixed condensed water 11 passing in the first downstream side line, to the reboiler drain tank 55.

In addition, the mixed condensed water 11 in the mixing tank 111 is supplied to the downstream side measurement instrument 72 through the second mixed liquid line 116. The physical quantity of the absorption liquid component in the mixed condensed water 11 is measured in the downstream side measurement instrument 72. The mixed condensed water 11 which has passed through the downstream side measurement instrument 72 is supplied, along with the mixed condensed water 11 supplied from the branched line 63, to the reboiler drain tank 55 in the first downstream side line 57.

During this time, the physical quantities of the absorption liquid component in the mixed condensed water 11 are respectively measured by the upstream side measurement instrument 71 and the downstream side measurement instrument 72. And the mixing gap that is the gap between the physical quantity of the absorption liquid component in the mixed condensed water 11 measured by the upstream side measurement instrument 71, and the physical quantity of the absorption liquid component in the mixed condensed water 11 measured by the downstream side measurement instrument 72 is obtained in the processor 81 of the controller 80. The processor determines whether or not the mixing gap has exceeded the mixing threshold value.

Here, when the processor 81 determines that the mixing gap has not exceeded the mixing threshold value, it is deemed that the upstream side measurement instrument 71 and the downstream side measurement instrument 72 are normal. And, the upstream side valve and the downstream side valve 67 are opened again, and the first supply valve 117, the second supply valve 118, the first mixed liquid valve 119 and the second mixed liquid valve 120 are closed again.

On the other hand, when the processor 81 determines that the mixing gap has exceeded the mixing threshold value, the upstream side valve 65, the first supply valve 117, the second supply valve 118, the first mixed liquid valve 119 and the second mixed liquid valve 120 are closed, and the downstream side valve 67 is opened. In addition, a valve not shown which is provided between a position from which the downstream side bypass line 110 branches and the downstream side measurement instrument 72 in the first downstream side line 57 is closed, and a valve not shown which is provided between the downstream side measurement instrument 72 and a position with which the downstream side bypass line 110 merges in the first downstream side line 57 is closed. By this means, the whole of the heated steam 6 which has been supplied to the upstream side line 51 is supplied to the reboiler 42, and the whole of the downstream side condensed water 10 which has been discharged from the reboiler 4 is supplied to the downstream side bypass line 110. By this means, supply of the upstream side condensed water 9 and the mixed condensed water 11 to the upstream side measurement instrument 71 is stopped, and supply of the downstream side condensed water 10 and the mixed condensed water to the downstream side measurement instrument 72 is stopped. Accordingly, the upstream side measurement instrument 71 and the downstream side measurement instrument 72 can be inspected, and can be calibrated, if necessary.

After the inspection, the physical quantities of the absorption liquid component in the mixed condensed water 11 are respectively measured again by the upstream side measurement instrument 71 and the downstream side measurement instrument 72, and whether or not the above-described mixing gap has exceeded the mixing threshold value is determined. When it is determined that the mixing gap has exceeded the mixing threshold value, the inspection is performed again. When it is determined that the mixing gap has not exceeded the mixing threshold value, it is deemed that the upstream side measurement instrument 71 and the downstream side measurement instrument 72 are normal. And, the upstream side valve 65 and the downstream side valve 67 are opened, and the first supply valve 117, the second supply valve 118, the first mixed liquid valve 119 and the second mixed liquid valve 120 are closed. By this means, the upstream side condensed water 9 is supplied to the upstream side measurement instrument 71, and the downstream side condensed water 10 is supplied to the downstream side measurement instrument 72.

Whether or not the physical quantity gap that is the gap between the physical quantity of the absorption liquid component in the upstream side condensed water 9 measured by the upstream side measurement instrument 71 and the physical quantity of the absorption liquid component in the downstream side condensed water 10 measured by the downstream side measurement instrument 72 has exceeded the threshold value is determined by the processor 81 of the controller 80.

When the processor 81 determines that the physical quantity gap has exceeded the threshold value, it is deemed that the absorption liquid component leaks in the reboiler 42, and the transmitter 82 commands to close the drain valve 61, and to open the waste liquid valve 62, and thereby the upstream side condensed water 9 and the downstream side condensed water 10 are supplied to the waste liquid tank 59 via the waste liquid line 60.

According to the present embodiment in this manner, the physical quantities of the absorption liquid component in the mixed condensed water generated by mixing the upstream side condensed water 9 with the downstream side condensed water 10 in the mixing tank 111 can be measured respectively by the upstream side measurement instrument 71 and the downstream side measurement instrument 72.

By this means, it is possible to easily detect whether or not an error specific to the measurement instrument or an error due to disturbance or the like is included in at least one of the measurement value of the upstream side measurement instrument 71 and the measurement value of the downstream side measurement instrument 72. When the error like this is included, the upstream side measurement instrument 71 and the downstream side measurement instrument 72 are calibrated, and thereby it is possible to improve detection accuracy of the leak of the absorption liquid component.

Above all, according to the present embodiment, the mixed condensed water 11 to be supplied to the upstream side measurement instrument 71 and the mixed condensed water 11 to be supplied to the downstream side measurement instrument 72 are the same condensed water to be supplied from the mixing tank 111. By this means, it is possible to more easily detect whether or not the above-described error is included in the measurement value of the upstream side measurement instrument 71 and the measurement value of the downstream side measurement instrument 72.

In addition, according to the present embodiment, it is possible to determine whether or not the mixing gap that is the gap between the physical quantity of the absorption liquid component in the mixed condensed water 11 measured by the upstream side measurement instrument 71 and the physical quantity of the absorption liquid component in the mixed condensed water 11 measured by the downstream side measurement instrument 72 has exceeded the mixing threshold value. When the mixing gap has exceeded the mixing threshold value, it can be deemed that an error specific to the measurement instrument or an error due to disturbance or the like is included in at least one of the measurement value of the upstream side measurement instrument 71 and the measurement value of the downstream side measurement instrument 72. For the reason, it is possible to easily detect accuracy deterioration of the upstream side measurement instrument 71 and the downstream side measurement instrument 72.

In addition, in the above-described present embodiment, the example in which the downstream side line 52 does not have the second downstream side line 58, and is composed of the first downstream side line 57, and the downstream side measurement instrument 72 is provided in the first downstream side line 57 has been described. However, without being limited to this, the configuration of the downstream side line 52 can be made the configuration shown in FIG. 2.

In addition, in the above-described present embodiment, the example has been described in which the physical quantities of the absorption liquid component in the mixed condensed water 11 are periodically measured by the upstream side measurement instrument 71 and the downstream side measurement instrument 72 respectively, and whether or not the mixing gap has exceeded the mixing threshold value is determined. However, without being limited to this, when the processor 81 determines that the above-described physical quantity gap has exceeded the threshold value, the transmitter 82 commands to close the upstream side valve 65 and the downstream side valve 67, and can open the first supply valve 117, the second supply valve 118, the first mixed liquid valve 119 and the second mixed liquid valve 120. The first supply valve 117 is one example of the first cutoff valve. The second supply valve 118 is one example of the second cutoff valve. The first mixed liquid valve 119 is one example of the first mixed water valve. The second mixed liquid valve 120 is one example of the second mixed water valve. In this case, the physical quantities of the absorption liquid component in the mixed condensed water 11 are respectively measured by the upstream side measurement instrument 71 and the downstream side measurement instrument 72, and whether or not the mixing gap has exceeded the mixing threshold values is determined. By this means, it is possible to detect whether or not an effect of an error specific to the measurement instrument or an error due to disturbance or the like is included in at least one of the measurement value of the upstream side measurement instrument 71 and the measurement value of the downstream side measurement instrument 72.

Fifth Embodiment

Next, a carbon dioxide capturing system and an operation method of a carbon dioxide capturing system in a fifth embodiment of the present invention will be described using FIG. 6.

Figure 6:
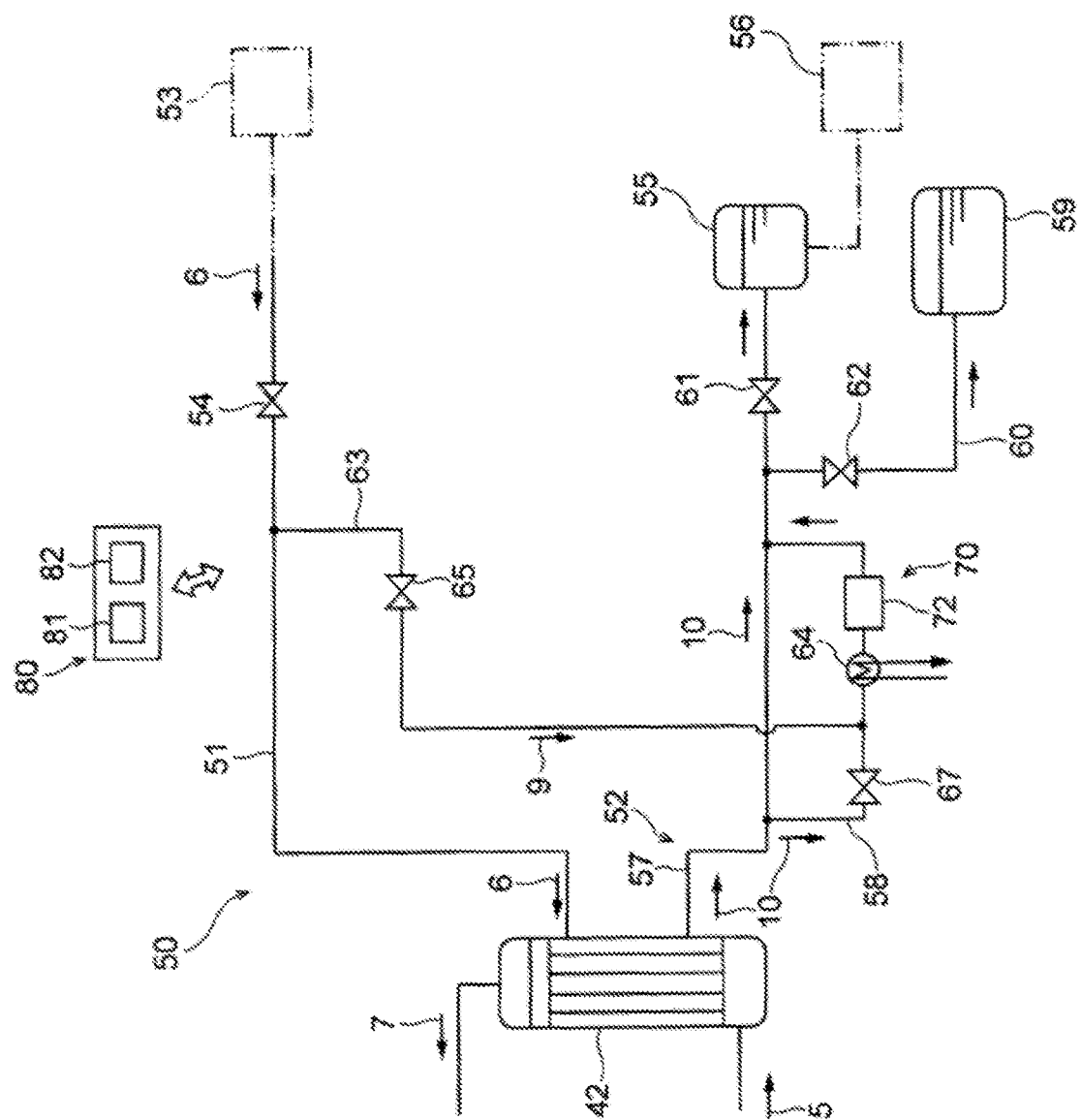
FIG. 6 is a diagram showing a heated steam supply and discharge system in a carbon dioxide capturing system in a fifth embodiment.

In the fifth embodiment shown in FIG. 6, a point that a physical quantity measurement device provided in the second downstream side line measures the physical quantity of the absorption liquid component of the upstream side condensed water, and in addition, measures the physical quantity of the absorption liquid component of the downstream side condensed water is mainly different from the first embodiment, and the other configuration is approximately the same as the first embodiment shown in FIG. 1 and FIG. 2. In addition, in FIG. 6, the same symbols are given to the same portions as the first embodiment shown in FIG. 1 and FIG. 2, and the detailed description thereof will be omitted.

As shown in FIG. 6, in the present embodiment, a physical quantity measurement device 70 does not have the upstream side measurement instrument 71, but is composed of the downstream side measurement instrument 72 provided in the downstream side line 52. The upstream side cooler 64 is provided on the upstream side of the downstream side measurement instrument 72 in the downstream side lien 54, that is, between the downstream side valve 67 and the downstream side measurement instrument 72. The downstream end of the branched line 63 is coupled to the upstream side of the upstream side cooler 64 in the downstream side line 52, that is, a portion between the downstream side valve 67 and the upstream side cooler 64.

At the time of normal operation, the upstream side valve 65 is closed, and the downstream side valve 67 is opened. In this case, a part of the downstream side condensed water 10 which has been discharged from the reboiler 42 to the first downstream side line 57 is supplied to the second downstream side line 58. The downstream side condensed water 10 which has been supplied to the second downstream side line 58 is cooled in the upstream side cooler 64. The cooled downstream side condensed water 10 is supplied to the downstream side measurement instrument 72 through the downstream side valve 67. The physical quantity of the absorption liquid component in the downstream side condensed water 10 is measured in the downstream side measurement instrument 72. The downstream side condensed water 10 which has passed through the downstream side measurement instrument 72 is returned to the first downstream side line 57, and is supplied to the reboiler drain tank 55.

Periodically, the upstream side valve 65 is opened and the downstream side valve 67 is closed. In this case, a part of the heated steam 6 which has been supplied from the heated steam supply source 53 to the upstream side line 51 is supplied to the branched line 63. The heated steam 6 which has been supplied to the branched line 63 is supplied to the second downstream side line 58, and is cooled and condensed by the upstream side cooler 64 provided in the second downstream side line 58. By this means, the upstream side condensed water 9 is generated. The generated upstream side condensed water 9 is supplied to the downstream side measurement instrument 72, and the physical quantity of the absorption liquid component in the upstream side condensed water 9 is measured in the downstream side measurement instrument 72. The upstream side condensed water 9 which has passed through the downstream side measurement instrument 72 is supplied to the first downstream side line 57, by-passes the downstream side measurement instrument 72, and is supplied, along with the downstream side condensed water 10 passing in the first downstream side line 57, to the reboiler drain tank 55.

The upstream side valve 65 and the downstream side valve 67 are switched in this manner, and thereby the physical quantity of the absorption liquid component in the upstream side condensed water 9 and the physical quantity of the absorption liquid component in the downstream side condensed water 10 can be obtained in the downstream side measurement instrument 72. In addition, it is preferable that the measurement of the physical quantity of the absorption liquid component is performed after the lapse of a sufficient time after the upstream side valve 65 and the downstream side valve 67 have been switched. By this means, it is possible to prevent that the condensed water before switching is mixed, and thereby it is possible to improve measurement accuracy of the physical quantity.

And, the physical quantity gap that is the gap between the physical quantity of the absorption liquid component in the upstream side condensed water 9 and the physical quantity of the absorption liquid component in the downstream side condensed water is obtained in the processor 81 of the controller 80. The processor 81 determines whether or not the physical quantity gap has exceeded the threshold value.

Here, when the processor 81 determines that the physical quantity gap has exceeded the threshold value, it is deemed that the absorption liquid component leaks in the reboiler 42, in the same manner as the first embodiment, and the transmitter 82 commands to close the drain valve 61 and to open the waste liquid valve 62. In this case, the upstream side condensed water 9 and the downstream side condensed water 10 which are passing in the first downstream side line 57 are recovered in the waste liquid tank 59 via the waste liquid line 60.

According to the present embodiment in this manner, the physical quantity of the absorption liquid component in the upstream side condensed water 9, and the physical quantity of the absorption liquid component in the downstream side condensed water 10 can be measured by the downstream side measurement instrument 72 provided in the second downstream side line 58. By this means, the physical quantity gap that is the gap between the physical quantity of the absorption liquid component in the upstream side condensed water 9 and the physical quantity of the absorption liquid component in the downstream side condensed water 10 is obtained, and when the physical quantity gap is large, it is possible to determine that the absorption liquid component is contained in the downstream side condensed water 10. For the reason, the number of measurement instruments for measuring a physical quantity of the absorption liquid component can be reduced, and thereby the system configuration can be simplified.

In the above-described present embodiment, the example in which the downstream side measurement instrument 72 periodically measures the physical quantity of the absorption liquid component in the upstream side condensed water 9 has been described. However, without being limited to this, a reference value of the physical quantity of the absorption liquid component in the downstream side condensed water 10 is previously stored in the processor 81, and when the physical quantity of the absorption liquid component in the downstream side condensed water 10 measured by the downstream side measurement instrument 72 has exceeded the reference value, the downstream side measurement instrument 72 can measure the physical quantity of the absorption liquid component in the upstream side condensed water 9. By this means, it is possible to detect whether or not an effect of an error specific to the measurement instrument or an error due to disturbance or the like is included in the measurement value of the downstream side measurement instrument 72.

According to the embodiments described above, it is possible to detect leak of the absorption liquid component in the reboiler with high accuracy.

While certain embodiments have been described, these embodiments have been presented by way of example only, and are not intended to limit the scope of the inventions. Indeed, the novel embodiments described herein can be embodied in a variety of other forms; furthermore, various omissions, substitutions and changes in the form of the embodiments described herein can be made without departing from the spirit of the inventions. The accompanying claims and their equivalents are intended to cover such forms or modifications as would fall within the scope and spirit of the inventions. In addition, as a matter of course, these embodiments can be combined partly and arbitrarily within the spirit of the present invention.

What is claimed is:

1. A carbon dioxide capturing system comprising:
   an absorption tower configured to absorb carbon dioxide contained in exhaust gas into an absorption liquid to form a rich liquid;
   a regeneration tower configured to connect to the absorption tower via a rich liquid line flowing the rich liquid from the absorption tower to the regeneration tower, and configured to generate the absorption liquid by separating the carbon dioxide from the rich liquid;
   a reboiler coupled to the regeneration tower configured to heat the absorption liquid inside the regeneration tower via a line comprising a heated steam line supplying heat from heated steam to the absorption liquid in the regeneration tower, and configured to condense the heated steam to generate downstream side condensed water;
   an upstream side line configured to supply the heated steam to the reboiler;
      a downstream side line configured to discharge the downstream side condensed water from the reboiler;
      a branched line configured to connect between the upstream side line and the downstream side line;
      a cooler arranged in the branched line, which cools and condenses the heated steam supplied from the upstream side line to the branched line to generate an upstream side condensed water; and
   a physical quantity measurement device arranged in the branched line comprising an upstream side measurement instrument and configured to measure a physical quantity of an absorption liquid component in the upstream side condensed water generated by the cooler in the branched line.

2. The carbon dioxide capturing system according to claim 1, further comprising a downstream side measurement instrument, which is arranged in the downstream side line, and configured to measure the physical quantity in the downstream side condensed water.

3. The carbon dioxide capturing system according to claim 2, father comprising:
   a reboiler drain tank, coupled to the downstream side line and to store the upstream side condensed water and the downstream side condensed water;
   a waste liquid tank, coupled to a waste liquid line branched from the downstream side line and to recover the upstream side condensed water and the downstream side condensed water;
   a drain valve arranged in the downstream side line; and
   a waste liquid valve configured to be arranged in the waste liquid line.

4. The carbon dioxide capturing system according to claim 3, further comprising:
   a controller;
   wherein the controller closes the drain valve and opens the waste liquid valve when a physical quantity gap that is a nap between the physical quantity of the absorption liquid component in the upstream side condensed water and the physical quantity of the absorption liquid component in the downstream side condensed water has exceeded a threshold value.

5. The carbon dioxide capturing system according to claim 2, further comprising:
   a first bypass line that branches from a position on an upstream side from the upstream side measurement instrument in the branched line and supplies the upstream side condensed water to the downstream side measurement instrument;
   a second bypass line that branches from a position on an upstream side from the downstream side measurement instrument in the downstream side line and supplies the downstream side condensed water to the upstream side measurement instrument;
   an upstream side valve provided at a portion between the position from which the first bypass line branches and the upstream side measurement instrument in the branched line;
   a downstream side valve provided at a portion between the position from which the second bypass line branches and the downstream side measurement instrument in the downstream side line;
   a first bypass valve provided in the first bypass line; and
   a second bypass valve provided in the second bypass line.

6. The carbon dioxide capturing system according to claim 5, further comprising:
   a controller;
   wherein when the upstream side valve and the nst am side valve are opened and the first bypass valve and the second bypass valve are closed, the controller calculates a first physical quantity gap that is the gap between the physical quantity of the absorption liquid component in the upstream side condensed water measured by the upstream side measurement instrument and the physical quantity of the absorption liquid component in the downstream side condensed water measured by the downstream side measurement instrument, and when the first physical quantity gap has exceeded a threshold value, the controller closes the upstream side valve and the downstream side valve and opens the first bypass valve and the second bypass valve.

7. The carbon dioxide capturing system according to claim 6 wherein when the upstream side valve and the downstream side valve are closed and the first bypass valve and the second bypass valve are opened, the controller calculates a second physical quantity gap that is a gap between a physical quantity of the absorption liquid component in the upstream side condensed water measured by the downstream side measurement instrument and a physical quantity of the absorption liquid component in the downstream side condensed water measured by the upstream side measurement instrument, and determines whether or not a measurement value gap that is a gap between the first physical quantity gap and the second physical quantity gap has exceeded a measurement threshold value.

8. The carbon dioxide capturing system according to claim 1, further comprising:
   a steam cooler provided on a downstream side from a position from which the branched line branches in the upstream side line;
   wherein the steam cooler cools the heated steam with the upstream side condensed water.

9. The carbon dioxide capturing system according to claim 2, further comprising:
   a mixing tank that mixes the upstream side condensed water with the downstream side condensed water to generate a mixed condensed water;
   a first supply line to supply the upstream side condensed water to the mixing tank;
   a second supply line to supply the downstream side condensed water to the mixing tank;
   a first mixed liquid line to supply the mixed condensed water from the mixing tank to the upstream side measurement instrument;
   a second mixed liquid line to supply the mixed condensed water from the mixing tank to the downstream side measurement instrument;
   an upstream side valve provided in the branched line;
   a downstream side valve provided in the downstream side line;
   a first supply valve provided in the first supply line;
   a second supply valve provided in the second supply line;
   a first mixed liquid valve provided in the first mixed liquid line; and
   a second mixed liquid valve provided in the second mixed liquid line.

10. The carbon dioxide capturing system according to claim 9, further comprising:
    a controller;
    wherein when the upstream side valve and the downstream side valve are dosed, and the first supply valve, the second supply valve, the first mixed liquid valve and the second mixed liquid valve are opened, the controller determines whether or not a mixing gap that is a gap between a physical quantity of the absorption liquid component in the mixed condensed water measured by the upstream side measurement instrument and a physical quantity of the absorption liquid component in the mixed condensed water measured by the downstream side measurement instrument has exceeded a mixing threshold value.

11. The carbon dioxide capturing system according to claim 1 wherein the downstream side line has a downstream side cooler, provided on an upstream side from the physical quantity measurement device, to cool the downstream side condensed water.

12. The carbon dioxide capturing system according to claim 1 wherein:
    the physical quantity measurement device is provided in the downstream side line;
    the cooler is provided on an upstream side of the physical quantity measurement device in the downstream side line; and
    the branched line is coupled to a portion of an upstream side of the cooler in the downstream side line.

* * * * *